United States Patent
Lam et al.

(10) Patent No.: US 10,809,537 B1
(45) Date of Patent: Oct. 20, 2020

(54) VARIFOCAL WAVEGUIDE DISPLAY WITH DYNAMICALLY BENT WAVEGUIDE

(71) Applicant: Facebook Technologies, LLC, Menlo Park, CA (US)

(72) Inventors: Wai Sze Tiffany Lam, Redmond, WA (US); Kyle Justin Curts, Snohomish, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 245 days.

(21) Appl. No.: 16/010,299

(22) Filed: Jun. 15, 2018

(51) Int. Cl.
| | |
|---|---|
| *G02B 26/08* | (2006.01) |
| *G02B 27/01* | (2006.01) |
| *G02B 27/00* | (2006.01) |
| *G02B 7/04* | (2006.01) |
| *G09G 3/02* | (2006.01) |
| *F21V 8/00* | (2006.01) |

(52) U.S. Cl.
CPC ....... *G02B 27/0179* (2013.01); *G02B 6/0028* (2013.01); *G02B 7/04* (2013.01); *G02B 27/0081* (2013.01); *G02B 27/0172* (2013.01); *G09G 3/02* (2013.01); *G02B 2027/0125* (2013.01); *G02B 2027/0185* (2013.01)

(58) Field of Classification Search
CPC .. G02B 27/0179; G02B 7/04; G02B 27/0172; G02B 6/0028; G02B 27/0081; G02B 2027/0125; G02B 2027/0185; G09G 3/02
USPC ....................................................... 359/202.1
See application file for complete search history.

(56) References Cited

U.S. PATENT DOCUMENTS 10,228,565 B1 * 3/2019 Saarikko ............ G02B 27/0172

* cited by examiner

*Primary Examiner* — Euncha P Cherry
(74) *Attorney, Agent, or Firm* — Fenwick & West LLP

(57) ABSTRACT

A waveguide display is used for presenting media to a user. The waveguide display, includes a light source, a projection assembly (PA), a source waveguide (SW), and an output waveguide (OW). The light source emits light, the PA reshapes the wavefront of the light and the SW receives the light from the PA, expands the light in a first dimension and outputs the expanded light. The SW has an adjustable curvature along the first dimension expanding the light with a curved wavefront. The OW receives the expanded light emitted from the SW, expands the expanded light in a second dimension orthogonal to the first dimension to form image light and outputs the image light. The wavefront curvature from the light source, the curvature of the OW along the second dimension and the curvature of the SW control a location of an image plane of the image light.

20 Claims, 8 Drawing Sheets

US 10,809,537 B1

VARIFOCAL WAVEGUIDE DISPLAY WITH DYNAMICALLY BENT WAVEGUIDE

BACKGROUND

The disclosure relates generally to near-eye-display systems, and more specifically to varifocal waveguide displays with one or more tunable projectors and one or more dynamically bent waveguides.

Near-eye light field displays project images directly into a user's eye, encompassing both near-eye displays (NEDs) and electronic viewfinders. Conventional near-eye displays (NEDs) generally have a display element that generates image light that passes through one or more lenses before reaching the user's eyes. Additionally, NEDs in virtual reality systems and/or augmented reality systems are typically designed to adjust a position of a focal plane of the image light for ease of use. However, designing a conventional NED to have a variable position of the focal plane can result in a relatively bulky and heavy NED due to the relatively large number and size of optical components (e.g. lenses, mirrors, etc.).

SUMMARY

A varifocal waveguide display (waveguide display) is used for presenting media to a user. The waveguide display includes a source waveguide, and an output waveguide. In some embodiments, the waveguide display includes a tunable projection assembly and a light source. The source waveguide includes an entrance area and an exit area. The source waveguide receives light at the entrance area, expands (e.g., via pupil replication) the light in a first dimension and outputs the expanded light from the exit area. The source waveguide has an adjustable first curvature along the first dimension to allow beam expansion with a wavefront curvature.

The output waveguide includes an entrance area and an exit area. The output waveguide receives the expanded light emitted from the source waveguide at the input area, expands (e.g., via pupil replication) the expanded light in a second dimension to form image light and outputs the image light using the exit area. In some embodiments, the second dimension is orthogonal to the first dimension. The tunable projection assembly, the second curvature of the output waveguide along the second dimension and the first curvature of the source waveguide control a location of an image plane of the image light.

In some configurations, the waveguide display includes a controller that generates and provides display instructions to the light source and tunable projection assembly, the source waveguide and the output waveguide. In some embodiments, the waveguide display is integrated into a frame as part of a near-eye display. The user of the near-eye display wears the frame.

Figure 1:
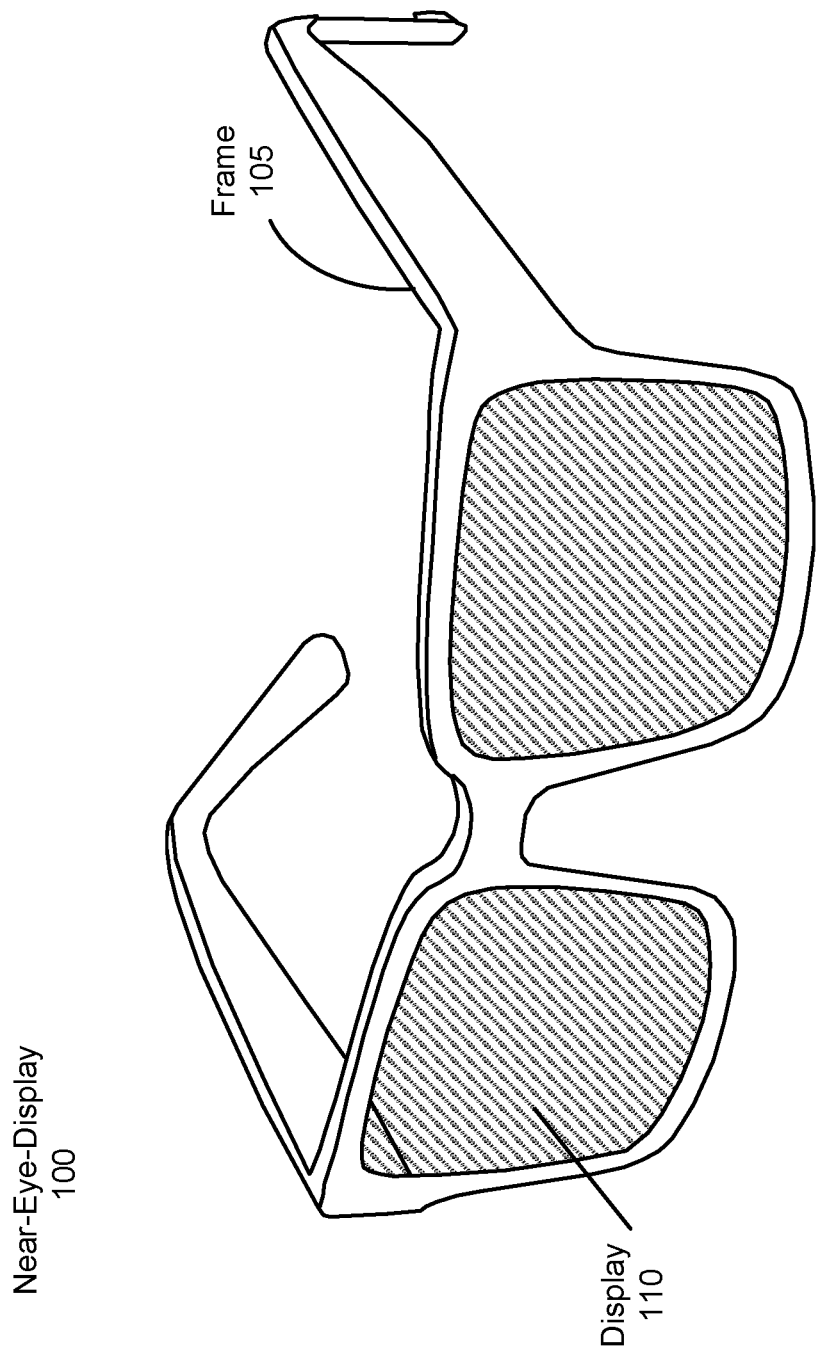
FIG. 1 is a diagram of a NED, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A varifocal waveguide display (referred to as a "waveguide display") is used for presenting media to a user. In some embodiments, the waveguide display is incorporated into, e.g., a near-eye-display (NED) as part of an artificial reality system. The waveguide display, includes a light source, a tunable projection assembly, a source waveguide, and an output waveguide. The light source and the tunable projection assembly may collectively be referred to as a source assembly. The source assembly is associated with a pupil. The source waveguide includes at least one entrance area and at least one exit area. The light source emits light which is collected by the tunable projection assembly. The tunable projection assembly adjusts the wavefront of the light (convergence, divergence or collimation) from the light source. The source waveguide receives the converging or diverging light from the tunable projection assembly at least one entrance area, expands (e.g., via pupil replication) the light in a first dimension and outputs the expanded light from the at least one exit area. The source waveguide has an adjustable curvature along the first dimension to incorporate the wavefront curvature in the first dimension of the light from the tunable projection assembly. The output waveguide includes an entrance area and an exit area. The output waveguide receives the converging or diverging expanded light emitted from the source waveguide at the entrance area, expands (e.g., via pupil replication) the expanded light in a second dimension orthogonal to the first dimension, incorporating the wavefront curvature in the second dimension of the light from the tunable projection assembly, to form image light and outputs the image light to an eyebox using the exit area.

In some embodiments, expansion of the image light is due to pupil (e.g., of the source assembly) replication at the eyebox, where a pupil is replicated in the eyebox in one or more dimensions. This expansion may occur over multiple dimensions, accordingly, light from a small pupil (e.g., 2×2 mm) can be expanded to fill a much larger eye box (e.g., 40×40 mm) which can increase ease of use for a user.

The wavefront curvature of the light from the tunable projection assembly, the curvature of the output waveguide along the second dimension and the curvature of the source waveguide along the first dimension control a location of an image plane of the image light emitted by the waveguide display. In some configurations, the wavefront curvature of the light from the tunable projection assembly matches the curvature of the source waveguide in the first dimension. In some configurations, the wavefront curvature of the light from the tunable projection assembly matches the curvature of the output waveguide in the second dimension. In some configurations, the curvature of the source waveguide along the first dimension is the same as the curvature of the output waveguide along the second dimension.

The tunable projection assembly collects light from the light source and adjusts the shape of the wavefront of the light (convergence, divergence or collimation). The tunable projection assembly controls the convergence, divergence or collimation of the light by using movement a conventional lens, an adjustable liquid lens, an adjustable liquid crystal lens, or other adjustable adaptive optics.

The source waveguide is coupled to one or more actuators (e.g., strip actuators, fluidic membrane actuators, etc.). The actuators cause the source waveguide within the waveguide display to bend along the first dimension, thereby generating curvature in the source waveguide. The curvature adjusts the wavefront of the light output from the source waveguide such that it has a curved wavefront that is converging or diverging in one dimension (e.g., similar to a larger light source passing through a cylindrical lens). Accordingly, the adjustable projection assembly and the actuators are able to vary an amount of optical power applied in the first dimension of the expanded light. The controller determines an amount of actuation to occur based on a desired position of an image plane of the waveguide display.

The output waveguide is also coupled to one or more actuators. The one or more actuators cause the output waveguide to bend along a second dimension that is different from and may be orthogonal to the first dimension, thereby generating curvature in the output waveguide. The actuators are able to vary a radius of curvature of the output waveguide; together with the adjustable projection assembly, they control an amount of optical power applied in the second dimension. Accordingly, the controller is able to vary a position of an image plane of the waveguide display, by adjusting the projection assembly, by adjusting curvature of the source waveguide in the first dimension, and by adjusting curvature of the output waveguide in the second dimension.

A configuration of the source waveguide can affect a field of view of light emitted from the waveguide display. And different embodiments may have different configurations of the source waveguide may vary. For example, different embodiments of the source waveguide can have an entrance area located in different locations. The source waveguide may be rectangular shaped and have a first end and a second end that is opposite the first end. In some embodiments, the entrance area is located on an input surface (side of waveguide that receives light) close to the first end or close to the second end of the source waveguide.

In some embodiments, the entrance area may be centered on the input surface between the first end and the second end, and a first exit area and a second exit area. The exit areas may be on the input surface or an output surface (side of the waveguide that emits light) of the source waveguide. In this configuration, the entrance area is positioned between the first exit area and the second exit area such that light is guided in two directions (toward both the first end and the second end) and results in a larger field of view than, e.g., a case with a single exit area and the entrance area located near the first end or the second end. Additional details of such a configuration are found in U.S. application Ser. No. 15/704,190, which is hereby incorporated by reference in its entirety.

Additionally, in some embodiments there is a first source and a second source, and light from the first source is incoupled at a first entrance area and light from the second source is incoupled at a second entrance area. And the first entrance area is located on the input surface near the first end and the second entrance area is located on the input surface near the second end. As light in this configuration is being guided from both the first end and the second end, it results in an increased field of view that is divided between the first entrance area and the second entrance area. Moreover, in this configuration brightness is uniform across the field of view. Additional details of such a configuration are found in U.S. application Ser. No. 15/721,074, which is hereby incorporated by reference in its entirety.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 is a diagram of a near-eye-display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an artificially reality NED. However, in some embodiments, the NED 100 may be modified to operate as a VR NED, an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. As discussed below in conjunction with FIG. 2, the display 110 includes at least one waveguide display assembly (not shown) for directing one or more image light to an eye of the user. The waveguide display assembly includes a tunable projection assembly and a waveguide display. The waveguide display is a display with a tunable projection assembly and one or more dynamically bent waveguides that can control a location of an image plane of the image light emitted from the waveguide display.

Figure 2:
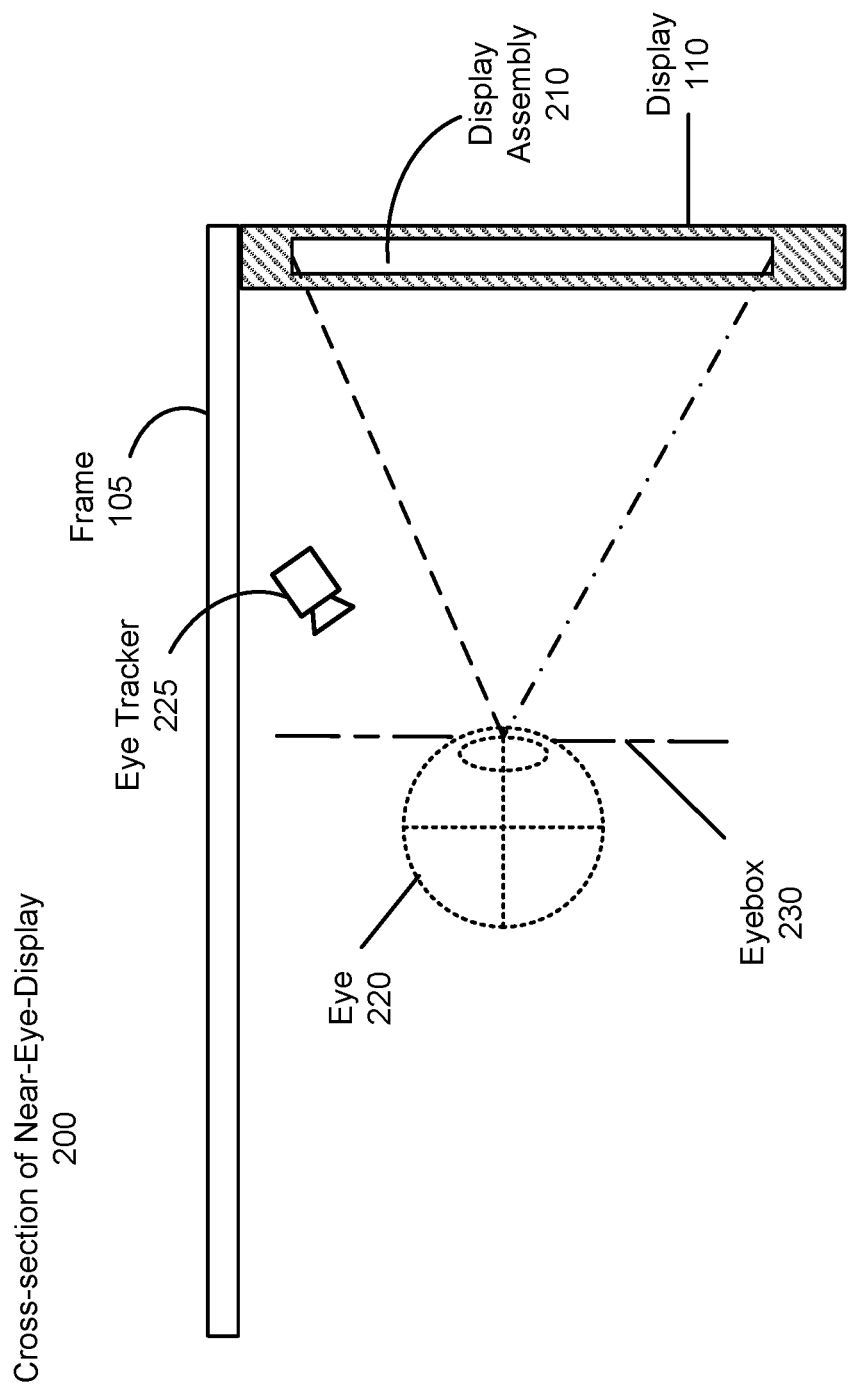
FIG. 2 is a cross-section of the NED illustrated in FIG. 1, in accordance with one or more embodiments.

FIG. 2 is a cross-section 200 of the NED 100 illustrated in FIG. 1, in accordance with an embodiment. The display 110 includes at least one display assembly 210, and an eye tracker 225. An eyebox 230 is a location where the eye 220 is positioned when the user wears the NED 100. For purposes of illustration, FIG. 2 shows the cross section 200 associated with a single eye 220 and a single display assembly 210, but in alternative embodiments not shown, another waveguide display assembly which is separate from the waveguide display assembly 210 shown in FIG. 2, provides image light to another eye 220 of the user.

The display assembly 210, as illustrated below in FIG. 2, is configured to direct the image light to the eye 220 through the eyebox 230. The display assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the display assembly 210 and the eye 220. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, a liquid lens, a convex lens, a concave lens, a filter, or any other suitable optical element that affects image light.

The eye tracker 225 tracks the gaze location of the user's eye 220 by determining a position and orientation of the user's eye 220 in the eyebox 230 over a period of time. The eye tracker 225 determines eye tracking information for the user's eye 220. The eye tracking information may comprise information about a position and an orientation of the user's eye 220 in the eyebox 230, i.e., information about a gaze location that corresponds to a foveal region of the user's eye 220.

The display assembly 210 includes at least one waveguide display. The waveguide display is a display with one or more dynamically bent waveguides which work together with the tunable projection assembly can control a location of an image plane of the image light emitted from the waveguide display. Embodiments of waveguide displays are discussed in detail below with regard to FIGS. 3-7. In some embodiments, the display assembly 210 includes a stack of a plurality of waveguide displays.

Figure 3:
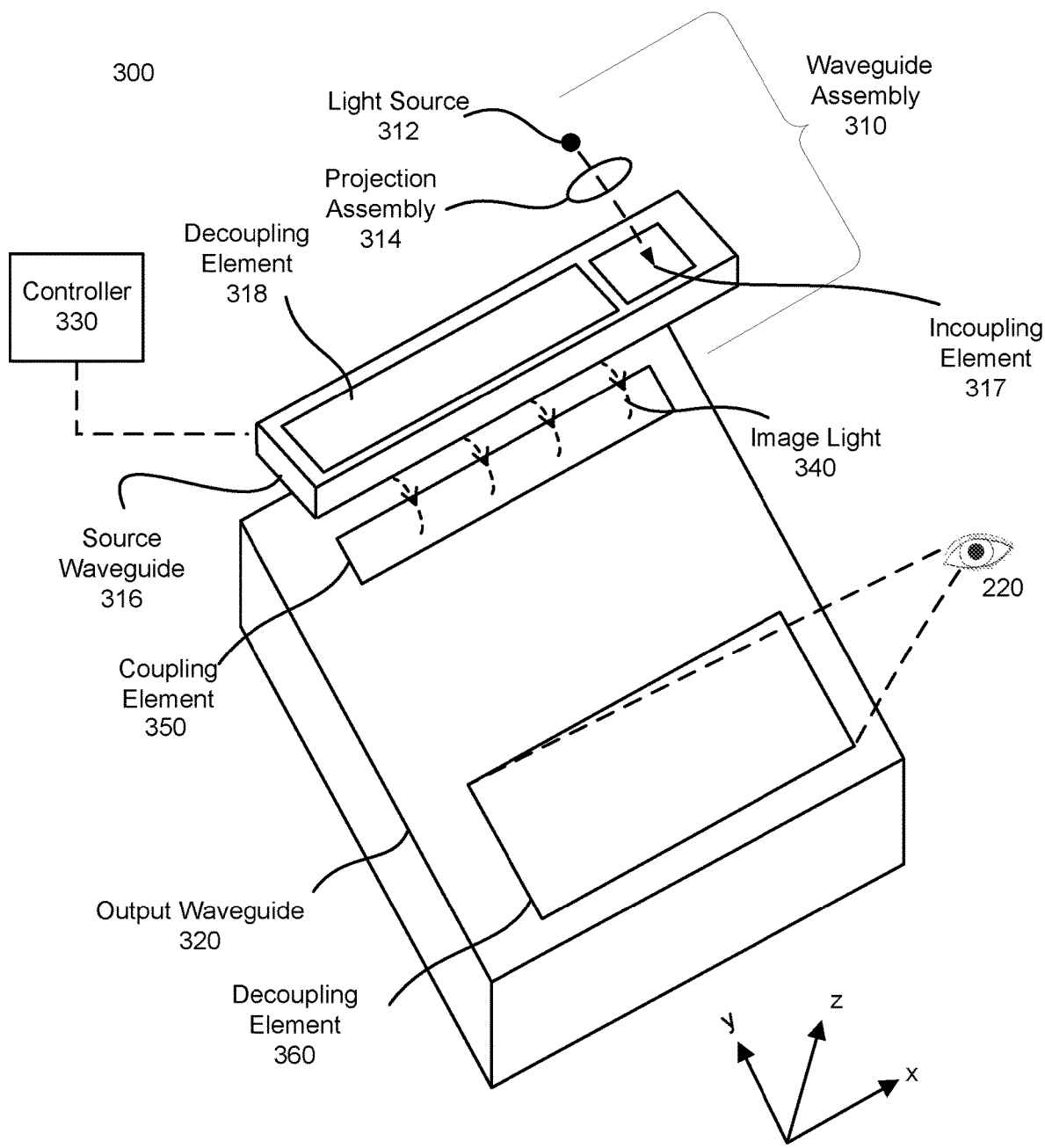
FIG. 3 illustrates an isometric view of a waveguide display, in accordance with one or more embodiments.

FIG. 3 illustrates an isometric view of a waveguide display 300, in accordance with an embodiment. In some embodiments, the waveguide display 300 (may also be referred to as a varifocal waveguide display) is a component (e.g., display assembly 210) of the NED 100. In alternate embodiments, the waveguide display 300 is part of some other NED, or other system that directs display image light to a particular location.

The waveguide display 300 includes at least a waveguide assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The waveguide assembly 310 generates image light. The waveguide display 300 controls a location of an image plane of the generated image light. The waveguide assembly 310 includes a light source 312, a tunable projection assembly 314, and a source waveguide 316. The waveguide assembly 310 generates and outputs image light 340 to a coupling element 350 of the output waveguide 320. The light source 312 and the tunable projection assembly 314 are collectively referred to as a source assembly.

The light source 312 is a source of light that generates at least a coherent or partially coherent image light. The light source 312 may be, e.g., a laser diode, a microLED, a vertical cavity surface emitting laser, a light emitting diode, a tunable laser, or some other light source that emits coherent or partially coherent light. The light source 312 emits light in a visible band (e.g., from about 390 nm to 700 nm), and it may emit light that is continuous or pulsed. In some embodiments, the light source 312 may be a laser that emits light at a particular wavelength (e.g., 532 nanometers). In some embodiments, the light source 312 is located close (e.g. 0.5 to 1 micron) to the projection assembly 314, The projection assembly 314 includes one or more optical components that condition the light from the light source. Conditioning light from the light source 312 may include, e.g., expanding, collimating, converging, diverging, adjusting optical power, or some combination thereof. In some embodiments, the adjusting optical power may be accomplished by mechanically translating a projection lens relative to the light source 312, using a tunable liquid crystal lens or a tunable liquid lens that adjusts the optical power in accordance with instructions from the controller 330. The one or more optical components may include, e.g., lenses, mirrors, apertures, gratings, liquid crystal lenses, or some combination thereof. As noted above, the light source 312 and the projection assembly 314 make up the source assembly. The source assembly has an associated pupil.

The source waveguide 316 is an optical waveguide configured to expand light (e.g., via pupil replication) in at least one dimension. The source waveguide 316 incouples the conditioned light at an incoupling element 317 located at an entrance area of the source waveguide 316. The incoupling element 317 incouples the conditioned light into the source waveguide 316. The source waveguide 316 receives the conditioned light emitted from the projection assembly 314 and expands (e.g., via pupil replication) the received light along the x-dimension. In some embodiments, the source waveguide 316 may also expand the conditioned light in other directions (e.g., in the y-dimension). The expanded light is outcoupled from the source waveguide 316 via a decoupling element 318 located an exit area of the source waveguide 316. The coupling element 317 may be, e.g., a diffraction grating, a holographic grating, some other element that couples the conditioned light into the source waveguide 316, or some combination thereof. And the decoupling element 318 may be, e.g., a diffraction grating, a holographic grating, some other element that outcouples the expanded light from the source waveguide 316, or some combination thereof.

In other embodiments, the entrance area and/or the exit area are located in a different position. In some embodiments, there are multiple entrance areas, and multiple incoupling elements 317. Configurations of the waveguide assembly 310 are also discussed in, e.g., U.S. application Ser. No. 15/704,190 and U.S. application Ser. No. 15/721,074, which are hereby incorporated by reference in their entirety.

The source waveguide 316 has an adjustable curvature along the x-dimension with a radius of curvature that changes in accordance with instructions from the controller 330. Functionally, together with the projection assembly 314 tuned to a certain optical power, the bending of the source waveguide 316 causes the source waveguide impart some optical power to light emitted from the source waveguide 315 in a at least a first dimension (e.g., the x-dimension). In some embodiments, the source waveguide 315 may be designed to impart optical power to light emitted from the source waveguide 314 in a single dimension), but not in a second orthogonal dimension (e.g., the y-dimension). And in some embodiments, the source waveguide 315 may be adjusted such that it imparts optical power in multiple dimensions (e.g., x and y). A radius of curvature of the source waveguide 316 may be adjusted to impart positive optical power, negative optical power, or no optical power.

The source waveguide 316 may be composed of one or more materials that facilitate total internal reflection of image light. The source waveguide 316 may be composed of e.g., silicon, plastic, glass, polymers, or some combination thereof. The source waveguide 316 has a relatively small form factor. For example, the source waveguide 316 may be approximately 50 mm long along x-dimension, 3 mm wide along y-dimension, and 0.3-1 mm thick along z-dimension. In some embodiments, the waveguide display 300 includes a plurality of source waveguides with each source waveguide outputting an image light of a specific band of optical wavelength (e.g. red, green, blue) and each of the source waveguide is vertically stacked with an offset. Further details of a stacked waveguide may be found in U.S. patent application Ser. No. 15/495,369, which is hereby incorporated by reference in its entirety.

In some embodiments, the waveguide assembly 310 may include one or more elements that act together with the bending of the source waveguide 316 to achieve a particular range of optical powers in the first dimension. For example, the projection assembly 314 includes a tunable lens. Functionally, the tunable lens acts as a tunable cylindrical lens that primarily imparts optical power in the first dimension (e.g., the x-dimension), but not in a second orthogonal dimension (e.g., the y-dimension). In alternate embodiments, the tunable lens may additionally impart some optical power (negative or positive) in the second dimension. The adjustment to the wavefront generally imparts some level of divergence in the first dimension, but in some embodiments, may alternatively collimate or cause the wavefront to converge. As the tunable lens imparts some level of optical power in the first dimension, it lessens the demand on the source waveguide 316 to impart additional optical power in the first dimension.

In another embodiment, other optical elements are included to reduce a range of bending of the source waveguide 316. As described below with reference to FIGS. 5A-B below, an additional static lens receives light from the source waveguide 316 and imparts additional optical power in the first dimension prior to providing the light to the output waveguide 320. Functionally, the static lens acts as a cylindrical lens that primarily imparts optical power in the first dimension (e.g., the x-dimension), but not in a second orthogonal dimension (e.g., the y-dimension). In alternate embodiments, the static lens may additionally impart some optical power (negative or positive) in the second dimension. The adjustment to the wavefront generally imparts some level of divergence in the first dimension, but in some embodiments, may alternatively collimate or cause the wavefront to converge or diverge. As the static lens imparts some level of optical power in the first dimension, it lessens the demand on the source waveguide 316 to impart additional bending in the first dimension for additional optical power. For example, for a target optical power of −1 diopter, the static lens may provide −0.5 diopters and the source waveguide provide −0.5 diopters.

In some embodiments, as described below with reference to FIG. 6, a scanning long fold mirror receives the image light 340 outputted by the waveguide assembly 310 and directs the received light to the output waveguide 320.

Note, it should be understood that the light source 312, the source waveguide 316 or some combination thereof may be scanned to generate a virtual image. For example, the source waveguide 316 may be rotated around a scan axis (parallel to x-dimension) to scan out the image. Similarly, a position of the light source 312 and/or projection assembly 314 relative to the incoupling element 317 may be adjusted to scan out the image. Additional details regarding scanning an image are found at, e.g., U.S. application Ser. No. 15/495,369, which is hereby incorporated by reference in its entirety.

The output waveguide 320 is a deformable optical waveguide that outputs image light to an eye 220 of a user. The output waveguide 320 may be composed of one or more materials that facilitate total internal reflection of the image light 340. The output waveguide 320 may be composed of e.g., silicon, plastic, glass, or polymers, or some combination thereof. The output waveguide 320 has a relatively small form factor. For example, the output waveguide 320 may be approximately 50 mm wide along x-dimension, 30 mm long along y-dimension and 0.3-1 mm thick along z-dimension.

The output waveguide 320 receives light from the source waveguide at an entrance area, expands (e.g., via pupil replication) the light in at least a second dimension (e.g. y-dimension) and outputs the expanded light from an exit area. The output waveguide 320 receives the image light 340 at one or more coupling elements 350, and guides the received input image light to one or more decoupling elements 360. In some embodiments, the coupling element 350 couples the image light 340 from the waveguide assembly 310 into the output waveguide 320. The coupling element 350 may be, e.g., a diffraction grating, a holographic grating, some other element that couples the image light 340 into the output waveguide 320, or some combination thereof. The decoupling element 360 decouples the total internally reflected image light from the output waveguide 320. The decoupling element 360 may be, e.g., a diffraction grating, a holographic grating, some other element that decouples image light out of the output waveguide 320, or some combination thereof.

In some embodiments, expanding the light is caused by replication of the pupil of the source assembly across one or more dimensions. In some embodiments the replicated pupils may overlap each other. The expansion may occur over one or more dimensions (do not need to be orthogonal), and in some embodiments (like the one illustrated) the expansion occurs over two orthogonal dimensions (e.g., the x and y dimension). The replicated pupils may fill some or all of the eyebox (e.g., 10-40 mm in diameter) and allow for easier placement of the eye 220 in the eyebox to view image content (e.g., relative to optical systems with a very small exit pupil (e.g., 2-3 mm in diameter).

In some embodiments, the output waveguide 320 is coupled to one or more actuators (not shown). The one or more actuators cause the output waveguide 320 to bend in accordance with display instructions, thereby generating curvature in the output waveguide 320. The wavefront curvature of the image light 340 from the source waveguide 316 and the curvature of output waveguide 320 together adjust a focal position, in one dimension, of image light appear to the eye 220. The amount of curvature introduced by the one or more actuators is controlled by a controller (e.g., controller 330). The output waveguide curvature enables the converging (or diverging) light expends to the emitted image light converges (or diverges) in one dimension. Functionally, the bending of the output waveguide 320 acts as a tunable cylindrical waveguide that adjusts (e.g., causes to converge or diverge) a wavefront of exiting light in at least the second dimension (e.g., the y-dimension). In some embodiments, the output waveguide 320 may be designed to impart optical power to light emitted from the output waveguide 320 in a single dimension), but not in a second orthogonal dimension (e.g., the x-dimension). And in some embodiments, the output waveguide 320 may be adjusted such that it imparts optical power in multiple dimensions (e.g., x and y). A radius of curvature of the output waveguide 320 may be adjusted to impart positive optical power, negative optical power, or no optical power on light exiting the output waveguide 320.

Note that optical power in the first dimension and the optical power in the second dimension control a location of a virtual image (i.e., control an image plane of the image light). Accordingly, the waveguide display 300 is able to vary the location of the virtual image by controlling a shape of the wavefront emitted from the source assembly in conjunction with controlling a radius of curvature of the source waveguide 316 in the first dimension and a radius of curvature of the output waveguide 330 in the second dimension.

Additionally, in some embodiments, a waveguide (i.e., the source waveguide 316 and/or the output waveguide 320) has a default radius of curvature in at least one dimension when no force is applied to the waveguide by one or more actuators. In these embodiments, the amount of force used to achieve a target radius of curvature may be less, as the default curvature already allows some level of curved wavefront expansion for some optical power in the at least one dimension.

In some instances, a target range of optical power in the first and the second dimension is such that it may cause an image plane (where the image is presented to the user) to split into different planes (i.e., one associated with the first dimension and the other associated with the second dimension). The splitting of the image plane can be avoided by, e.g., using one or more elements (static lens and/or a freeform lens) that act to reduce a range of bending of the output waveguide 320 to achieve a particular range of optical powers in the second dimension, bending the output waveguide 320 in x-dimension, or some combination thereof. For example, an additional static lens receives light from the output waveguide 320 and imparts additional optical power in the second dimension prior to providing the light to the eyebox. Functionally, the static lens acts as a cylindrical lens that primarily imparts optical power in the second dimension (e.g., the y-dimension), but not in the first dimension (e.g., the x-dimension). In alternate embodiments, the static lens may additionally impart some optical power (negative or positive) in the first dimension. The adjustment to the wavefront generally imparts some level of divergence in the second dimension, but in some embodiments, may alternatively collimate or cause the wavefront to converge. As the static lens imparts some level of optical power in the second dimension, it lessens the demand on the output waveguide 320 to impart additional optical power in the second dimension and can mitigate splitting of the image plane that might otherwise occur.

Likewise, as described in detail below with regard to FIG. 7 a freeform lens placed between the output waveguide 320 and the eyebox can also mitigate splitting of the image plane.

Figure 7:
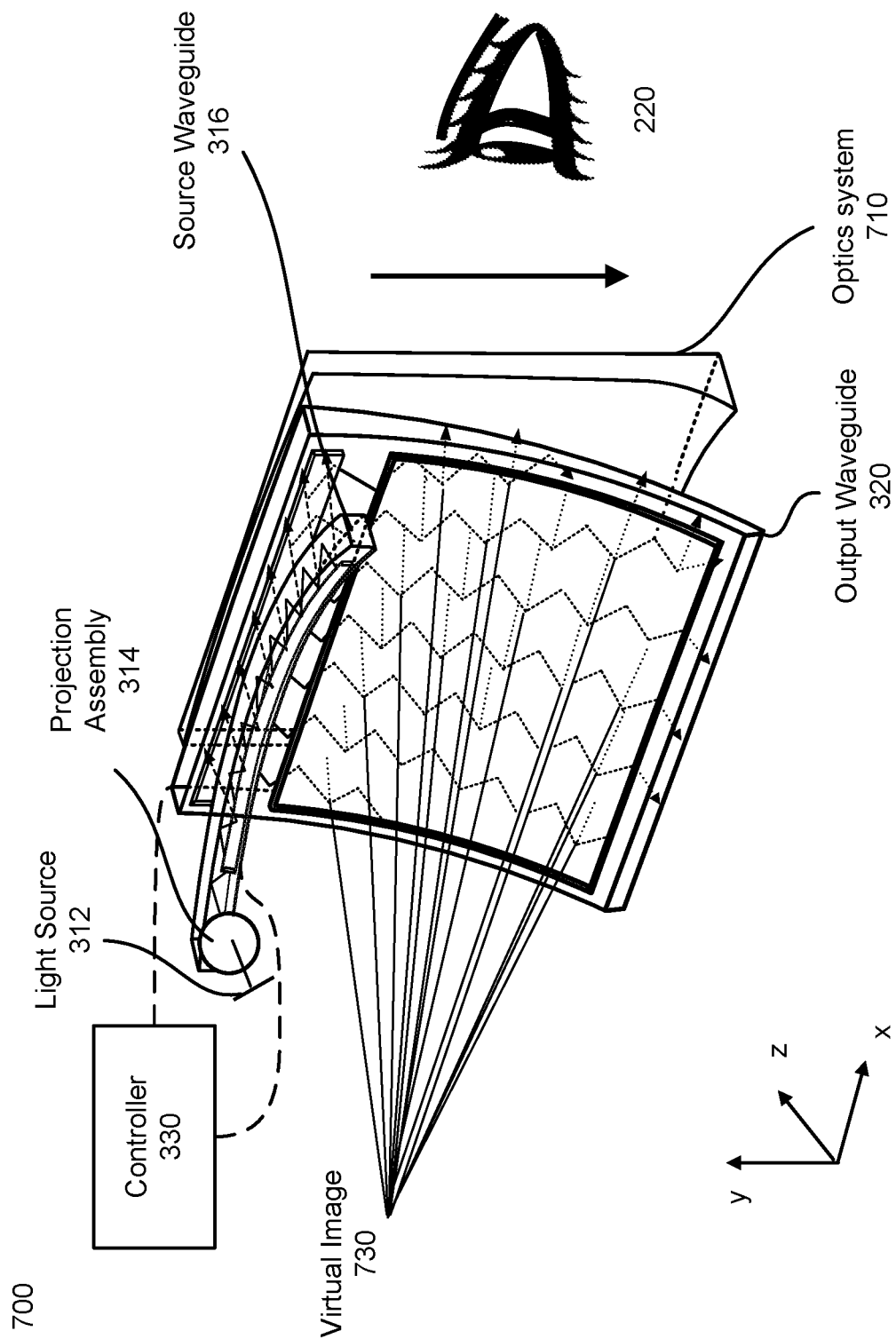
FIG. 7 illustrates a portion of a waveguide display with a tunable projection assembly, one or more dynamically curved waveguides and a freeform lens, in accordance with one or more embodiments.

And in some embodiments, the controller 330 provides display instructions to perform an additional bending of the output waveguide 320 along the first dimension (e.g., the x-dimension). In one example, the output waveguide 320 is bent along the x-dimension such that the bend curvature is a function of y. The radius of curvature along the y-dimension of the output waveguide 320 is according to the equation below:

$$y = \frac{x^2/R_x + z^2/R_z(x)}{1 + \sqrt{1 - x^2/R_x^2 - z^2/R_z(x)^2}} \qquad (1)$$

where (x, y, z) refers to the coordinate shown in FIG. 7, $R_x$ refers to a radius of curvature in x-dimension, and $R_z(x)$ refers to a radius of curvature in z-dimension. In some embodiments, the output waveguide 320 is bent to a freeform shape to minimize wavefront aberration in the virtual image.

The controller 330 controls the display operations of the waveguide assembly 310. The controller 330 determines display instructions for the waveguide assembly 310. Display instructions are instructions to render one or more images. In some embodiments, display instructions may simply be an image file (e.g., bitmap). The display instructions may be received from, e.g., a console of an artificial reality system (e.g., as described below in conjunction with FIG. 8). Display instructions are instructions used by the waveguide display 300 to generate an image. The display instructions may include, e.g., a type of a source of image light (e.g. monochromatic, polychromatic), a scanning rate, a radius of curvature of the source waveguide 316, a radius of curvature of the output waveguide 320, an optical power of a tunable lens in the projection assembly 314, a type of actuation, or some combination thereof. The controller 330 controls the tunable projection assembly 314 to control wavefront curvature of the light provided to the incoupling element 317. The controller 330 also controls an actuator assembly (not shown here) that performs an adjustment of curvature of the source waveguide 316 and/or the output waveguide 320. The controller 330 includes a combination of hardware, software, and/or firmware not shown here so as not to obscure other aspects of the disclosure.

The controller 330 controls the bending operations of the source waveguide 316 and the output waveguide 320. The controller 330 determines actuation instructions for the waveguide display 300 based on one or more control signals that determine an operation of one or more actuators coupled to the one or more waveguides. The controller 330 generates actuation instructions that control which actuators in an actuator assembly that bend one or more optical waveguides to achieve a target radius of curvature along a specific dimension of each of the source waveguide and the output waveguide 320.

The radius of curvature of the source waveguide 316 and the output waveguide 320 are adjusted using one or more actuators that perform an adjustment of curvature of the source waveguide in accordance with instructions from the controller 330. An actuator may be, e.g., a strip actuator (e.g., bimorph strip actuator), a fluidic membrane actuator, a piezo actuator, or some other actuator. The actuators may be positioned along one or more surfaces of the source waveguide 316 along one or more axes that are parallel to the first dimension (e.g., the x-dimension) and one or more surfaces of the output waveguide 320 along one or more axes that are parallel to the second dimension (e.g., the y-dimension). For example, the actuators may be placed on an input side of the source waveguide 316 (side that receives light from the projection assembly 314) and/or an output side of the source waveguide 316 that is opposite the input side. The actuators are placed such that they do not interfere with incoupling or outcoupling of light from the source waveguide 316. Likewise, the actuators may be placed on an input side of the output waveguide 320 (side that receives light from the source waveguide 316) and/or an output side of the output waveguide 320 that is opposite the input side. The actuators are placed such that they do not interfere with incoupling or outcoupling of light from the output waveguide 320.

In some embodiments, where strip actuators are used, multiple strip actuators may be stacked to increase an amount of applied force. Moreover, the strip actuators may be stacked such that a bend axis varies to control the bend profile of the source waveguide 316 and/or the output waveguide 320. And in a stacked waveguide embodiment (i.e., a separate source waveguide 316 for each color channel), the strip actuators may be placed between the stacked waveguides.

In some embodiments where a fluidic membrane actuator is used, a fluid pump is used to control a fluid pressure within one or more bladders of the fluidic membrane actuator. The pump may be remotely located (e.g., in a frame of the NED). The fluidic membrane actuator is placed such that it does not interfere with incoupling or outcoupling of light from the waveguides. In other embodiments, the fluidic membrane actuator is transparent and cover some or all of the input surface or the output surface of a waveguide (source waveguide 316 and/or output waveguide 320).

Figure 4A:
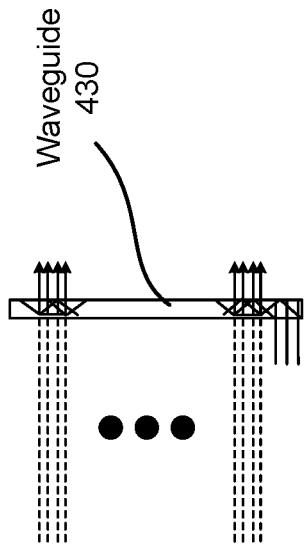
FIG. 4A illustrates a cross-section of a portion of a waveguide display in a state that imparts no optical power, in accordance with one or more embodiments.
Figure 4A:
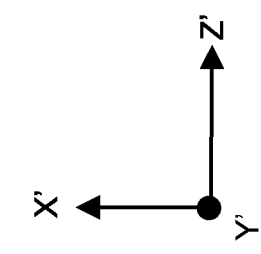

FIG. 4A illustrates a cross-section 400 of a portion of a waveguide display in a state that imparts no optical power, in accordance with one or more embodiments. The cross-section 400 of the portion of the waveguide display includes a waveguide 430. Light received by the waveguide 430 is expanded (e.g., via replication of a pupil multiple times along the X'-dimension) prior to being output. The waveguide display is an embodiment of the waveguide display 300, and the waveguide 430 may be the source waveguide 316 or the output waveguide 320.

The waveguide 430 is deformable, however, as illustrated does not have a radius of curvature which imparts optical power in an X'-dimension. Accordingly, in these embodiments, the waveguide imparts zero diopters of optical power to light output from the waveguide 430 with respect to the X'-dimension.

Figure 4B:
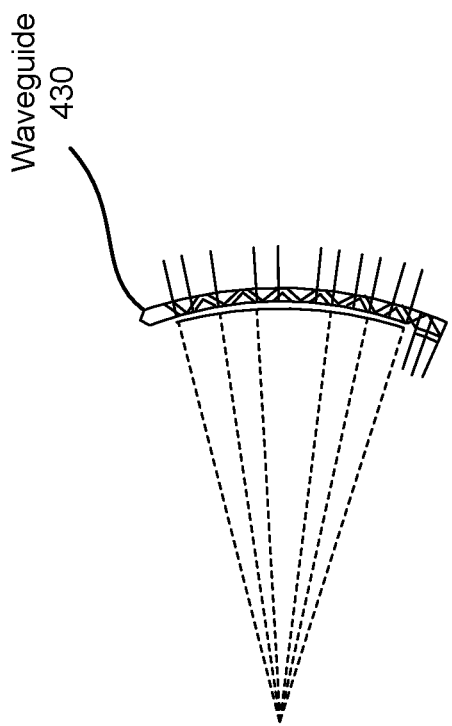
FIG. 4B illustrates a cross-section of the portion of the waveguide display of FIG. 4A in a state for providing negative optical power, in accordance with one or more embodiments.
Figure 4B:
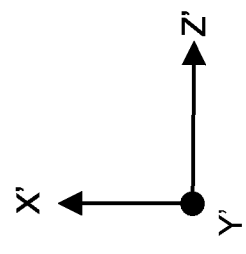

FIG. 4B illustrates a cross-section 405 of the portion of a waveguide display of FIG. 4A in a state for providing negative optical power (e.g., −0.5 diopters), in accordance with one or more embodiments. For example, the light is expanded in the sense that a pupil is replicated multiple times in the X'-dimension. In the example of FIG. 4B, the waveguide 430 is dynamically bent along the X'-dimension to change a radius of curvature of the waveguide 430 in accordance with display instructions from the controller 330 (not shown here). Different radii of curvature correspond to different optical powers. Functionally, the bending of the waveguide 430 causes the waveguide 430 to act as a tunable cylindrical lens that primarily imparts optical power in the first dimension (e.g., the X'-dimension), but not in a second dimension that is orthogonal to the X'-dimension (e.g., the Y'-dimension). The controller 330 determines an amount of actuation to occur based on a desired focus position for the first dimension.

Note that the waveguide display of FIG. 4A includes at least two waveguides 430, and they are configured such that one waveguide (e.g., a source waveguide) provides optical power in the first dimension and the second waveguide (e.g., an output waveguide) provides optical power in the second dimension. Adjusting optical power in the first dimension and optical power in the second dimension control a location of a virtual image (i.e., control an image plane of the image light). Accordingly, the waveguide display of FIG. 4A is able to vary the location of the virtual image by controlling the wavefront curvature of the light from the projection assembly, and by controlling a radius of curvature (i.e., controlling the optical power in the first dimension) of each of the waveguides.

Figure 5A:
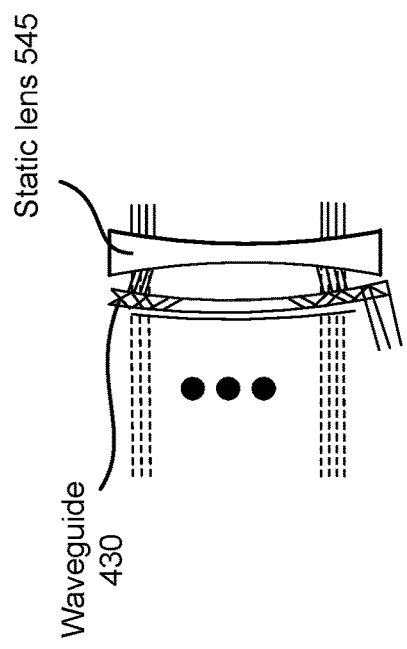
FIG. 5A illustrates a cross-section of a portion of a waveguide display that includes a static lens, the waveguide display in a state that imparts no optical power, in accordance with one or more embodiments.
Figure 5A:
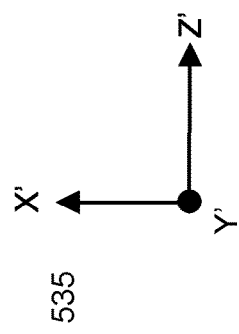

FIG. 5A illustrates a cross-section 535 of a portion of a waveguide display that includes a static lens 545, the waveguide display in a state that imparts no optical power, in accordance with one or more embodiments. The cross-section 535 of the waveguide display includes the source waveguide 430 and the static lens 545. The waveguide display is an embodiment of the waveguide display 300, and the waveguide 430 may be the source waveguide 316 or the output waveguide 320.

The waveguide 430 expands received light (e.g., via pupil replication) and outputs a curved wavefront in accordance with instructions from a controller (e.g., the controller 330). For example, a radius of curvature of the waveguide 430 is adjusted to provide a first positive optical power in the first dimension (i.e., the X'-dimension).

The static lens 545 imparts additional optical power in the first dimension. In this embodiment the static lens is a negative lens that imparts a fixed amount of negative power in at least the first dimension. Functionally, the static lens acts as a cylindrical lens that primarily imparts optical power in the first dimension (e.g., the X'-dimension), but not in the second dimension (e.g., the Y'-dimension). In alternate embodiments, the static lens 545 may additionally impart some optical power (negative or positive) in the second dimension. For example, for an effective optical power of 0 diopters, the static lens 545 may provide −0.5 diopters and the source waveguide provide +0.5 diopters. The effective optical power is the total optical power imparted to the light in a particular dimension by the waveguide 430 and the static lens 545. In some configurations, as the static lens 545 imparts some level of optical power in the first dimension, it can reduce a range of bending of the waveguide 430 to achieve a particular range of effective optical powers.

Figure 5B:
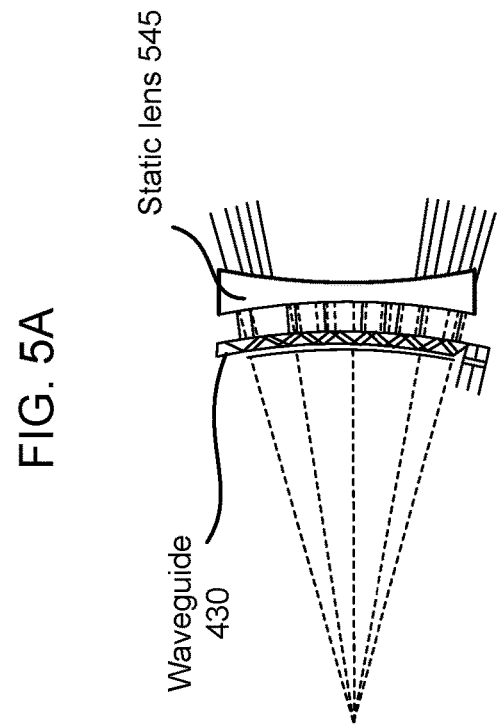
FIG. 5B illustrates a cross-section of the portion of the waveguide display in FIG. 5A in a state for providing negative optical power, in accordance with one or more embodiments.
Figure 5B:
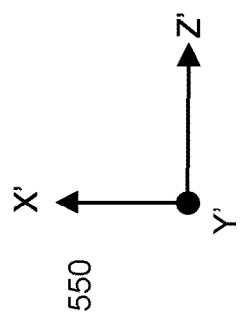

FIG. 5B illustrates a cross-section 550 of the portion of the waveguide display in FIG. 5A in a state for providing negative optical power, in accordance with one or more embodiments.

The waveguide 430 imparts some amount of optical power in accordance with instructions from a controller (e.g., the controller 330). In FIG. 5B a radius of curvature of the waveguide 430 is adjusted to provide a first negative optical power in the first dimension (i.e., the X'-dimension). Different radii of curvature correspond to different optical powers.

The static lens 545 imparts additional optical power in the first dimension. In this embodiment, the static lens is a negative lens that imparts a fixed amount of negative power in at least the first dimension. The effective optical power is the total optical power imparted to the light in a particular dimension by the waveguide 430 and the static lens 545. For example, if the waveguide 430 imparted −0.5 diopter and the static lens 545 imparted −0.5 diopters, the effective optical power would be −1.0 diopters in the first dimension.

Note that the waveguide display can include at least two waveguides 430, and they are configured such that one waveguide (e.g., a source waveguide) accommodates optical power in the first dimension and the second waveguide (e.g., an output waveguide) accommodates optical power in the second dimension. Adjusting optical power in the first dimension and optical power in the second dimension control a location of a virtual image (i.e., control an image plane of the image light). Accordingly, the waveguide display is able to vary the location of the virtual image by controlling the tunable projection assembly and a radius of curvature of each of the waveguides.

Figure 6:
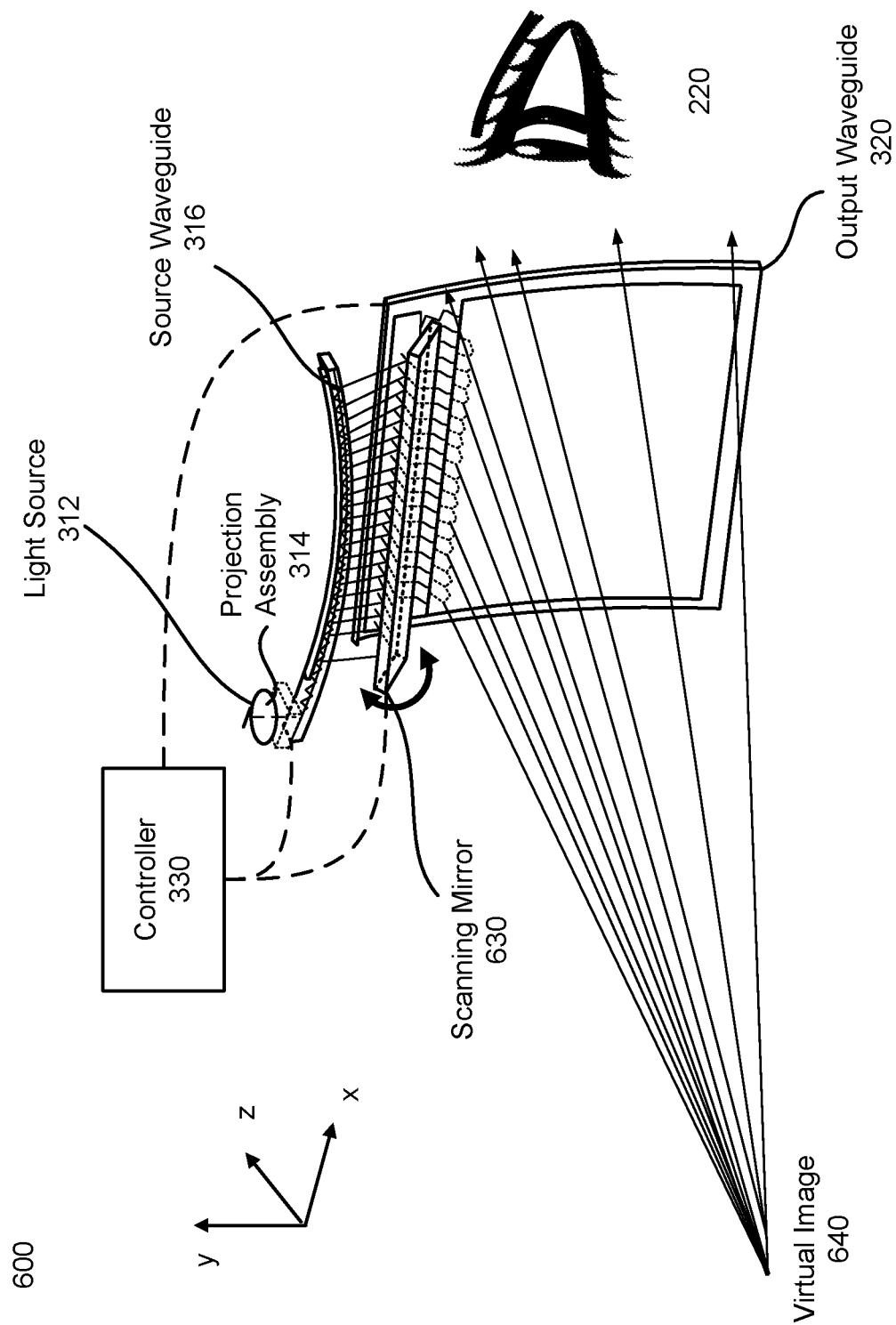
FIG. 6 illustrates a waveguide display with a tunable projection assembly, one or more dynamically curved waveguides and a scanning mirror, in accordance with one or more embodiments.

FIG. 6 illustrates a waveguide display 600 with a tunable projection assembly, one or more dynamically curved waveguides and a scanning mirror 630, in accordance with an embodiment. The waveguide display 600 is an embodiment of the waveguide display 300 that includes the scanning mirror 630. The waveguide display 600 includes the output waveguide 320, the controller 330, the light source 312, the projection assembly 314, the source waveguide 316, and the scanning mirror 630. The tunable projection assembly emits light with a dynamically tunable wavefront curvature in at least one of the first dimension (e.g. x-dimension) and the second dimension (y-dimension). The tunable projection assembly controls the wavefront of the light source 312 in one or more dimensions (e.g. x-dimension) by at least one of: a movable lens, a zoom lens, a liquid lens, a liquid crystal lens, or some combination thereof The scanning mirror 630 is an optical element that scans incident light in at least along one dimension based on scanning instructions from the controller 330. The scanning mirror 630 redirects light via one or more reflective portions based on specific orientations of the reflective portions. In some embodiments, the scanning mirror 630 scans in at least two dimensions (e.g. horizontal and vertical dimensions). The scanning mirror 630 can also perform a raster scanning both horizontally and vertically. In some embodiments, the scanning mirror 630 is a galvanometer mirror. For example, the galvanometer mirror may represent any electromechanical instrument that indicates that it has sensed an electric current by deflecting a beam of image light with one or more mirrors. In alternate embodiments, the scanning mirror 630 is a MEMS mirror. For example, the MEMS mirror can include a plurality of micro-fabricated optical components made on a semiconductor wafer.

As shown in FIG. 6, the output waveguide 320 receives expanded light (e.g., via pupil replication) from the scanning mirror 630. The output waveguide 320 expands (e.g., via pupil replication) the expanded light in at least the y-dimension, and outputs the expanded light to form a virtual image 640 as seen by the user's eye 220. Note that the location of the image plane (where the rays converge) can be adjusted in the z dimension by adjusting the wavefront curvature from the source assembly, adjusting a radius of curvature for the source waveguide 316, adjusting a radius of curvature of the output waveguide 320, or some combination thereof.

FIG. 7 illustrates a portion of a waveguide display 700 with a tunable projection assembly, one or more dynamically curved waveguides and a freeform lens 710, in accordance with an embodiment. The waveguide display 700 is an embodiment of the waveguide display 300 that includes the freeform lens 710. The waveguide display 700 includes the output waveguide 320, the controller 330, the light source 312, the source waveguide 316, the projection assembly 314, and the freeform lens 710. The tunable projection assembly emits light with a dynamically tunable wavefront curvature in at least one of the first dimension (e.g. x-dimension) and the second dimension (y-dimension). The tunable projection assembly controls the wavefront of the light source 312 in one or more dimensions (e.g. x-dimension) by at least one of: a movable lens, a zoom lens, a liquid lens, a liquid crystal lens, or some combination thereof.

In some instances, a target range of optical power in the first (e.g., the x-dimension) and the second dimension (e.g., the y-dimension) is such that it may cause an image plane (where the image is presented to the user) to split into different planes (i.e., one associated with the first dimension and the other associated with the second dimension). The splitting of the image plane is avoided by using the freeform lens 710. The freeform lens 710 is located between the output waveguide 320 and an eyebox (location occupied by the eye 220 during use). The freeform lens 710 increases the divergent power along the x-z plane in order to reduce variation of the focal length for the second dimension of the output waveguide 320 along the z-dimension. The freeform lens 710 may also correct wavefront aberration of the light after the output waveguide 320, and improve image quality at the virtual image viewed by the eye 220. Note that the waveguide display 700 may have less bending of each of the source waveguide 316 and the output waveguide 320 when compared to a waveguide display that does not include the freeform lens 710.

As shown in FIG. 7, the output waveguide 320 receives light expanded (e.g., via pupil replication) in x-dimension from the source waveguide 316. The output waveguide 320 expands (e.g., via pupil replication) the expanded light in y-dimension and outputs the expanded light to form a virtual image 730 as seen by the user's eye 220. Note that the location of the image plane (where the rays converge) can be adjusted in the z dimension by adjusting the wavefront curvature from the source assembly, adjusting a radius of curvature for the source waveguide 316, and adjusting a radius of curvature of the output waveguide 320, or some combination thereof.

System Environment

Figure 8:
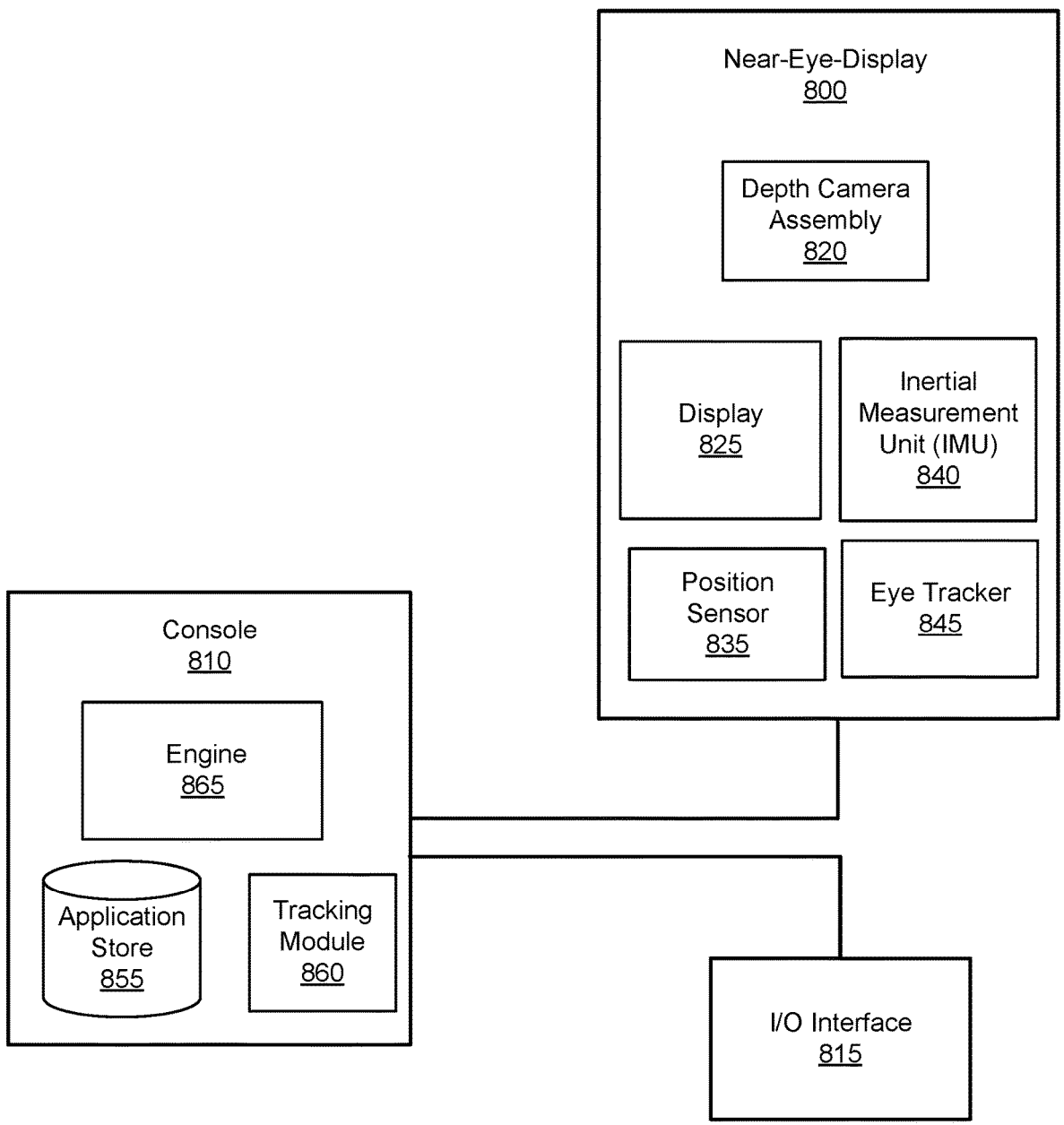
FIG. 8 is a block diagram of an artificial reality system including a NED, in accordance with one or more embodiments.

FIG. 8 is a block diagram of a system 800 including a NED 800, in accordance with one or more embodiments. The system 800 shown by FIG. 8 comprises the NED 800, and an I/O interface 815 that are each coupled to the console 810. While FIG. 8 shows an example system 800 including one NED 800 and one I/O interface 815, in other embodiments, any number of these components may be included in the system 800. For example, there may be multiple NEDs 800 each having an associated I/O interface 815, with each NED 800 and I/O interface 815 communicating with the console 810. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 810 is provided by the NED 800.

The NED 800 is a near-eye display that presents media to a user. In some embodiments, the NED 800 is an embodiment of the NED 800. Examples of media presented by the NED 800 include one or more images, video, audio, or some combination thereof. In some embodiments, audio is presented via an external device (e.g., speakers and/or headphones) that receives audio information from the NED 800, the console 810, or both, and presents audio data based on the audio information. In some embodiments, the NED 800 may act as an artificial reality eye-wear glass. In some embodiments, the NED 800 augments views of a physical, real-world environment with computer-generated elements (e.g., images, video, sound, etc.).

The NED 800 includes a DCA 820, a display 825, one or more position sensors 835, an IMU 840, and an eye tracker 845. Some embodiments of the NED 800 have different components than those described in conjunction with FIG. 8. Additionally, the functionality provided by various components described in conjunction with FIG. 8 may be differently distributed among the components of the NED 800 in other embodiments.

The DCA 820 captures data describing depth information of a local area surrounding some or all of the NED 800. The DCA 820 can compute the depth information using the data (e.g., based on a captured portion of a structured light pattern), or the DCA 820 can send this information to another device such as the console 810 that can determine the depth information using the data from the DCA 820. The DCA 820 includes a camera assembly (that includes one or more cameras), and may include an illumination source. The illumination source may emit, e.g., pulses of light and/or structured light into a local area. The camera assembly captures images of the emitted light reflected from objects in the local area. The DCA 820 determines depth information using the captured images. In some embodiments, the DCA 820 may determine depth information using stereoscopic images obtained from the camera assembly.

The display 825 includes one or more waveguide displays 300. Details for the waveguide display 300 are discussed in detail above with reference to FIGS. 3-7. The display 825 can control a location of an image plane of image light emitted from the display 825 by adjusting a tunable projection assembly and by adjusting a radius of curvature for a source waveguide and a corresponding output waveguide. The display 825 may adjust the location of the image plane based on eye tracking information provided by the eye tracker 845. In this manner, the display 825 may mitigate vergence-accommodation conflict.

The IMU 840 is an electronic device that generates data indicating a position of the NED 800 based on measurement signals received from one or more of the position sensors 835 and from depth information received from the DCA 820. A position sensor 835 generates one or more measurement signals in response to motion of the NED 800. Examples of position sensors 835 include: one or more accelerometers, one or more gyroscopes, one or more magnetometers, another suitable type of sensor that detects motion, a type of sensor used for error correction of the IMU 840, or some combination thereof. The position sensors 835 may be located external to the IMU 840, internal to the IMU 840, or some combination thereof.

Based on the one or more measurement signals from one or more position sensors 835, the IMU 840 generates data indicating an estimated current position of the NED 800 relative to an initial position of the NED 800. For example, the position sensors 835 include multiple accelerometers to measure translational motion (forward/back, up/down, left/right) and multiple gyroscopes to measure rotational motion (e.g., pitch, yaw, roll). In some embodiments, the IMU 840 rapidly samples the measurement signals and calculates the estimated current position of the NED 800 from the sampled data. For example, the IMU 840 integrates the measurement signals received from the accelerometers over time to estimate a velocity vector and integrates the velocity vector over time to determine an estimated current position of a reference point on the NED 800. Alternatively, the IMU 840 provides the sampled measurement signals to the console 810, which interprets the data to reduce error. The reference point is a point that may be used to describe the position of the NED 800. The reference point may generally be defined as a point in space or a position related to the NED 800's orientation and position.

The IMU 840 receives one or more parameters from the console 810. The one or more parameters are used to maintain tracking of the NED 800. Based on a received parameter, the IMU 840 may adjust one or more IMU parameters (e.g., sample rate). In some embodiments, certain parameters cause the IMU 840 to update an initial position of the reference point so it corresponds to a next position of the reference point. Updating the initial position of the reference point as the next calibrated position of the reference point helps reduce accumulated error associated with the current position estimated the IMU 840. The accumulated error, also referred to as drift error, causes the estimated position of the reference point to "drift" away from the actual position of the reference point over time. In some embodiments of the NED 800, the IMU 840 may be a dedicated hardware component. In other embodiments, the IMU 840 may be a software component implemented in one or more processors.

The eye tracker 845 determines eye tracking information associated with an eye of a user wearing the NED 800. The eye tracking information determined by the eye tracker 845 may comprise information about an orientation of the user's eye, i.e., information a gaze location that corresponds to a foveal region of the user's eye. An embodiment of the eye tracker 845 may comprise an illumination source and an imaging device (camera). The eye tracker 845 is configured to track the gaze location corresponding to the foveal region of a user's eye. The eye tracker 845 may provide information about the tracked gaze location to display 825. The eye tracker 845 may be an embodiment of the eye tracker 225 of the NED 800, as described above with reference to FIG. 2.

The I/O interface 815 is a device that allows a user to send action requests and receive responses from the console 810. An action request is a request to perform a particular action. For example, an action request may be an instruction to start or end capture of image or video data or an instruction to perform a particular action within an application. The I/O interface 815 may include one or more input devices. Example input devices include: a keyboard, a mouse, a game controller, or any other suitable device for receiving action requests and communicating the action requests to the console 810. An action request received by the I/O interface 815 is communicated to the console 810, which performs an action corresponding to the action request. In some embodiments, the I/O interface 815 includes an IMU 840 that captures IMU data indicating an estimated position of the I/O interface 815 relative to an initial position of the I/O interface 815. In some embodiments, the I/O interface 815 may provide haptic feedback to the user in accordance with instructions received from the console 810. For example, haptic feedback is provided when an action request is received, or the console 810 communicates instructions to the I/O interface 815 causing the I/O interface 815 to generate haptic feedback when the console 810 performs an action.

The console 810 provides content to the NED 800 for processing in accordance with information received from one or more of: the DCA 820, the NED 800, and the I/O interface 815. In the example shown in FIG. 8, the console 810 includes an application store 855, a tracking module 860, and an engine 865. Some embodiments of the console 810 have different modules or components than those described in conjunction with FIG. 8. Similarly, the functions further described below may be distributed among components of the console 810 in a different manner than described in conjunction with FIG. 8.

The application store 855 stores one or more applications for execution by the console 810. An application is a group of instructions, that when executed by a processor, generates content for presentation to the user. Content generated by an application may be in response to inputs received from the user via movement of the NED 800 or the I/O interface 815. Examples of applications include: gaming applications, conferencing applications, video playback applications, or other suitable applications.

The tracking module 860 calibrates the system 800 using one or more calibration parameters and may adjust one or more calibration parameters to reduce error in determination of the position of the NED 800 or of the I/O interface 815. For example, the tracking module 860 communicates a calibration parameter to the DCA 820 to adjust the focus of the DCA 820 to more accurately determine positions of structured light elements captured by the DCA 820. Calibration performed by the tracking module 860 also accounts for information received from the IMU 840 in the NED 800 and/or an IMU 840 included in the I/O interface 815. Additionally, if tracking of the NED 800 is lost (e.g., the DCA 820 loses line of sight of at least a threshold number of structured light elements), the tracking module 860 may re-calibrate some or all of the system 800.

The tracking module 860 tracks movements of the NED 800 or of the I/O interface 815 using information from the DCA 820, the one or more position sensors 835, the IMU 840 or some combination thereof. For example, the tracking module 860 determines a position of a reference point of the NED 800 in a mapping of a local area based on information from the NED 800. The tracking module 860 may also determine positions of the reference point of the NED 800 or a reference point of the I/O interface 815 using data indicating a position of the NED 800 from the IMU 840 or using data indicating a position of the I/O interface 815 from an IMU 840 included in the I/O interface 815, respectively. Additionally, in some embodiments, the tracking module 860 may use portions of data indicating a position or the NED 800 from the IMU 840 as well as representations of the local area from the DCA 820 to predict a future location of the NED 800. The tracking module 860 provides the estimated or predicted future position of the NED 800 or the I/O interface 815 to the engine 865.

The engine 865 generates a 3D mapping of the area surrounding some or all of the NED 800 (i.e., the "local area") based on information received from the NED 800. In some embodiments, the engine 865 determines depth information for the 3D mapping of the local area based on information received from the DCA 820 that is relevant for techniques used in computing depth. The engine 865 may calculate depth information using one or more techniques in computing depth from structured light. In various embodiments, the engine 865 uses the depth information to, e.g., update a model of the local area, and generate content based in part on the updated model.

The engine 865 also executes applications within the system 800 and receives position information, acceleration information, velocity information, predicted future positions, or some combination thereof, of the NED 800 from the tracking module 860. Based on the received information, the engine 865 determines content to provide to the NED 800 for presentation to the user. For example, if the received information indicates that the user has looked to the left, the engine 865 generates content for the NED 800 that mirrors the user's movement in a virtual environment or in an environment augmenting the local area with additional content. Additionally, the engine 865 performs an action within an application executing on the console 810 in response to an action request received from the I/O interface 815 and provides feedback to the user that the action was performed. The provided feedback may be visual or audible feedback via the NED 800 or haptic feedback via the I/O interface 815.

In some embodiments, based on the eye tracking information (e.g., orientation of the user's eye) received from the eye tracker 845, the engine 865 determines resolution of the content provided to the NED 800 for presentation to the user. The engine 865 provides the content to the NED 800 having a maximum pixel resolution on the electronic display in a foveal region of the user's gaze, whereas the engine 865 provides a lower pixel resolution in other regions of the electronic display, thus achieving less power consumption at the NED 800 and saving computing cycles of the console 810 without compromising a visual experience of the user. In some embodiments, the engine 865 can further use the eye tracking information to adjust where objects are displayed on the electronic display to mitigate vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in image light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the disclosed subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure.

What is claimed is:

1. A waveguide display, comprising:
   a source waveguide including an entrance area and an exit area, the source waveguide configured to receive light at the entrance area, expand the light in a first dimension and output the expanded light from the exit area, the source waveguide having an adjustable first curvature along the first dimension; and
   an output waveguide including an entrance area and an exit area, the output waveguide coupled to receive the expanded light emitted from the source waveguide at the entrance area, expand the expanded light in a second dimension to form image light and output the image light using the exit area, and a second curvature of the output waveguide along the second dimension and the first curvature of the source waveguide control a location of an image plane of the image light.

2. The waveguide display of claim 1, further comprising:
   a tunable projection assembly configured to emit light with a dynamically tunable wavefront curvature in at least one of the first dimension and the second dimension.

3. The waveguide display of claim 2, further comprising:
   a controller configured to generate display instructions and provide the display instructions to the tunable projection assembly, the source waveguide and the output waveguide.

4. The waveguide display of claim 3, wherein the controller is configured to control the tunable projection assembly and to provide wavefront curvature to a light source.

5. The waveguide display of claim 3, wherein the controller further comprises:
   an actuator assembly comprising a first actuator and a second actuator, and the first actuator is configured to adjust the first curvature of the source waveguide and the second actuator is configured to adjust the second curvature of the output waveguide.

6. The waveguide display of claim 5, wherein the actuator assembly comprises at least one of: one or more bimorph strip actuators, one or more fluidic membrane actuators, one or more piezo actuators, or some combination thereof.

7. The waveguide display of claim 5, wherein the actuator assembly adjusts a curvature of the output waveguide along the first dimension in accordance with the display instructions provided by the controller.

8. The waveguide display of claim 2, wherein the tunable projection assembly is configured to control wavefront of a light source in one or more dimensions by at least one of: a movable lens, a zoom lens, a liquid lens, a liquid crystal lens, or some combination thereof.

9. The waveguide display of claim 1, further comprising:
   a freeform lens configured to receive the image light outputted by the output waveguide, adjust an optical power of the image light in at least one dimension, and direct the adjusted image light toward an eyebox.

10. The waveguide display of claim 1, further comprising:
    a tunable lens at a first optical power of a first range of optical powers in the first dimension, the tunable lens configured to apply the first optical power to adjust a wavefront of light from a light source prior to providing the adjusted light to the entrance area of the source waveguide.

11. The waveguide display of claim 1, further comprising:
    a static lens that has a fixed optical power in the first dimension, the static lens positioned between the source waveguide and the output waveguide, and configured to impart the fixed optical power on the expanded light.

12. The waveguide display of claim 1, further comprising:
    a static lens that has a fixed optical power in the second dimension, the static lens positioned between the output waveguide and an eyebox, and configured to impart the fixed optical power on the image light.

13. A near-eye display (NED), comprising:
    a frame configured to be worn by a user;
    a waveguide display that is integrated into the display, the waveguide display comprising:
      a light source configured to emit light;
      a source waveguide including an entrance area and an exit area, the source waveguide configured to receive the light at the entrance area, expand the light in a first dimension and output the expanded light from the exit area, the source waveguide having an adjustable curvature along the first dimension; and
      an output waveguide including an entrance area and an exit area, the output waveguide coupled to receive the expanded light emitted from the source waveguide at the entrance area, expand the expanded light in a second dimension to form image light and output the image light using the exit area, and a curvature of the output waveguide along the second dimension and the curvature of the source waveguide control a location of an image plane of the image light.

14. The NED of claim 13, further comprising:
    a tunable projection assembly configured to emit light with a dynamically tunable wavefront curvature in at least one of the first dimension and the second dimension.

15. The NED of claim 14, further comprising:
a controller configured to generate display instructions and provide the display instructions to the tunable projection assembly, the source waveguide and the output waveguide.

16. The NED of claim 15, wherein the controller is configured to control the tunable projection assembly and to provide wavefront curvature to a light source.

17. The NED of claim 14, wherein the controller further comprises:
an actuator assembly comprising a first actuator and a second actuator, and the first actuator is configured to adjust the first curvature of the source waveguide and the second actuator is configured to adjust the second curvature of the output waveguide.

18. The NED of claim 17, wherein the actuator assembly comprises at least one of: one or more bimorph strip actuators, one or more fluidic membrane actuators, one or more piezo actuators, or some combination thereof.

19. The NED of claim 14, wherein the tunable projection assembly is configured to control wavefront of a light source in one or more dimensions by at least one of: a movable lens, a zoom lens, a liquid lens, a liquid crystal lens, or some combination thereof.

20. The NED of claim 14, further comprising:
a freeform lens configured to receive the image light outputted by the output waveguide, adjust an optical power of the image light in at least one dimension, and direct the adjusted image light toward an eyebox.

* * * * *